(12) United States Patent
Wilson et al.

(10) Patent No.: US 8,988,803 B1
(45) Date of Patent: Mar. 24, 2015

(54) PRE-AMPLIFIER INPUT STAGE FOR MULTI-ELEMENT MAGNETO-RESISTIVE HEADS

(71) Applicant: LSI Technologies Inc., Allentown, PA (US)

(72) Inventors: Ross S. Wilson, Menlo Park, CA (US); Jason S. Goldberg, Mendota Heights, MN (US); Edwin X. Li, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/454,843

(22) Filed: Aug. 8, 2014

(51) Int. Cl.
*G11B 5/09* (2006.01)
*G11B 5/02* (2006.01)

(52) U.S. Cl.
USPC .............................. 360/46; 360/67

(58) Field of Classification Search
CPC ........ G11B 20/0009; G11B 5/09; G11B 5/02; G11B 5/012; G11B 2005/0021; G11B 15/125; H03F 3/602; H03F 1/0288; G01D 5/145
See application file for complete search history.

(56) References Cited

U.S. PATENT DOCUMENTS

| | | | |
|---|---|---|---|
| 5,144,502 | A | 9/1992 | Somers |
| 5,343,337 | A | 8/1994 | Jurneke |
| 5,517,369 | A | 5/1996 | Takeuchi et al. |
| 5,774,291 | A | 6/1998 | Contreras et al. |
| 5,953,173 | A | 9/1999 | Klaassen et al. |

FOREIGN PATENT DOCUMENTS

EP   0459579 B1   11/1995

*Primary Examiner* — Nabil Hindi
(74) *Attorney, Agent, or Firm* — Suiter Swantz pc llo (57) ABSTRACT

Individual magneto-resistive read elements are connected to the pre-amplifier through a multi-conductor transmission line; one side of each magneto-resistive read element is taken to a single common lead which is also received in the read pre-amplifier. Amplification and bias control are performed by the read pre-amplifier. A low-noise input stage amplifier configuration accommodates a shared common lead in a multi-head environment. Means for independently biasing the magneto-resistive read elements are also provided. Feedback loops are employed to regulate the operating points of the input stages, and to set the potential of the common head terminal. Two-dimensional magnetic recording system testability is enhanced by ability to multiplex any head to a single system output.

17 Claims, 6 Drawing Sheets

PRE-AMPLIFIER INPUT STAGE FOR MULTI-ELEMENT MAGNETO-RESISTIVE HEADS

BACKGROUND OF THE INVENTION

In devices with a magnetic storage medium, a head slider bearing an array of magneto-resistive read elements reads data from a rotating multi-track magnetic storage medium. A central head reads the central track while other heads are disposed to either side of the central head to read portions of bordering tracks. In the event of track misregistration, the head-array is displaced from its nominal position. Adjacent track interference is sampled and mitigated by multi-dimensional signal-processing algorithms in the read channel, leading to improved error-rate performance relative to a single-reader configuration.

Multiple magneto-resistive read elements in the head slider increase the complexity of the read element circuitry. Each magneto-resistive read element requires two terminals. Consequently, it would be advantageous if an apparatus existed that is suitable for receiving and amplifying the outputs of multiple magneto-resistive read elements sharing a common terminal.

SUMMARY OF THE INVENTION

Accordingly, the present invention is directed to a novel method and apparatus for receiving and amplifying the outputs of multiple magneto-resistive read elements in a head slider sharing a common terminal.

In one embodiment of the present invention, a pre-amplifier serving multiple magneto-resistive read elements are connected to the pre-amplifier through a multi-conductor transmission line; one side of each two terminal magneto-resistive read element is taken to a single common lead which is also received in the read pre-amplifier yielding in an N-head configuration N+1 interconnects rather than 2N interconnects. Amplification and bias control are performed by the read pre-amplifier.

In another embodiment of the present invention, a low-noise input stage amplifier configuration accommodates a shared common lead in a multi-head environment. Means independently to bias the Magneto-resistive read elements are also provided. Feedback loops are employed to regulate the operating points of the input stages, and to set the potential of the common Head terminal. Two-dimensional magnetic recording system testability is enhanced by ability to multiplex any head to a single pre-amplifier output.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
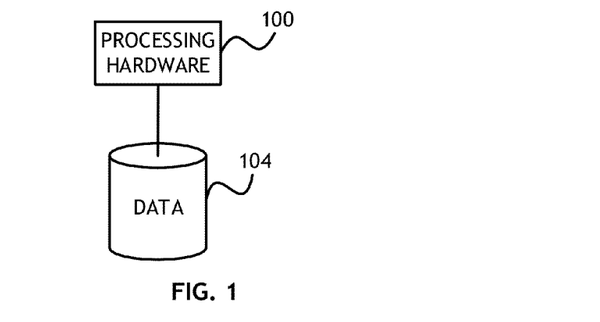
FIG. 1 shows a data storage device suitable for use with at least one embodiment of the present invention.

Referring to FIG. 1, a data storage device according suitable for use with at least one embodiment of the present invention is shown. A data storage device accord to at least one embodiment of the present invention includes a magnetic data storage element 104 and processing hardware 100 connected to the magnetic data storage element 104. The magnetic data storage element 104 includes a sliding read head having a plurality of magneto-resistive read elements, each connected to a common lead. In at least one embodiment, the processing hardware 100 includes pre-amplification circuitry associated with the plurality of magneto-resistive heads sharing a common lead of each magneto-resistive read element in the magnetic data storage element.

Figure 2:
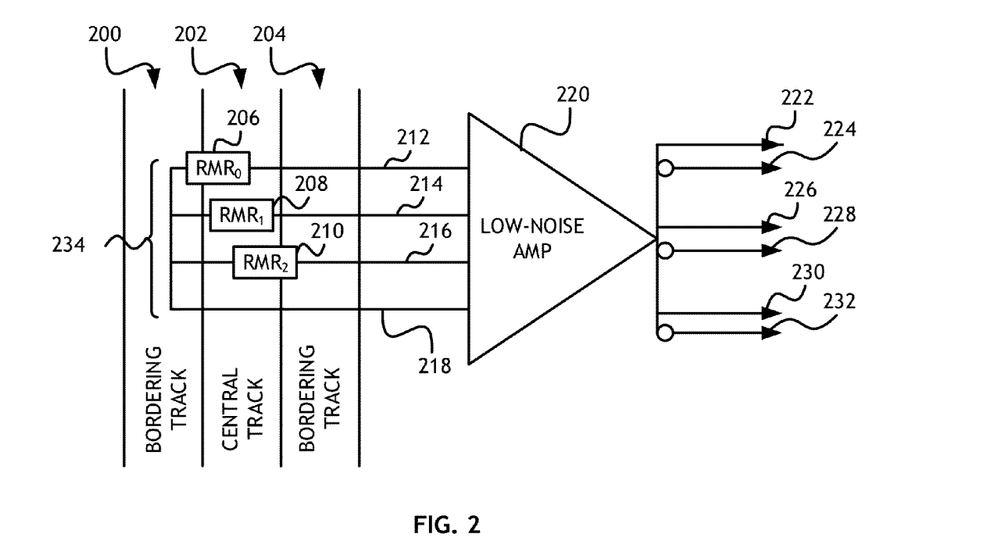
FIG. 2 shows a pre-amplifier according to embodiments of the present invention.

Referring to FIG. 2, a pre-amplifier according to embodiments of the present invention is shown. In at least one embodiment of the present invention, a head slider 234 bearing an array of three magneto-resistive read elements 206, 208, 210 is disposed over a central, principal, track 202 on a storage medium. Two-dimensional magnetic recording increases areal density by accounting for recorded information bordering the principal track 202, thus mitigating the degradation of read error rate caused by track misregistration. Two-dimensional magnetic recording implementation requires use of a head slider 234 bearing multiple magneto-resistive read elements 206, 208, 210. Conventionally, each magneto-resistive element would be provided with dedicated terminal-pairs for connection to the reader pre-amplifier 220. A primary magneto-resistive read element 208 reads the central track 202. Ancillary magneto-resistive read elements 206, 210 are disposed to either side of the primary magneto-resistive read element 208 by an amount typically 20% of a track-width, and also read portions of bordering tracks 200, 204, respectively.

As magneto-resistive read element 206, 208, 210 outputs are small, typically −10 mVpp, they require low-noise amplification 220 prior to transmission to the read channel 222, 224, 226, 228, 230, 232, as well as provision of bias current.

For an N-element 206, 208, 210 Reader 234, straightforward connection to the Pre-amplifier 220 requires 2N pads and interconnects. Space limitations on both the head slider 234 and in trace area on the transmission line flex-circuit joining the magneto-resistive read elements 206, 208, 210 to the pre-amplifier 220 render a line pair-per-element configuration undesirable. Therefore, multiple magnetoresistive elements in head sliders are configured to share a common lead.

In at least one embodiment of the present invention, a preamplifier is disclosed that serves heads and interconnects having only N+1 interconnects. The ability to support such a configuration leads to reduced pad counts and interconnect area, enhancing disc file manufacturability and reliability. Interconnect area and head and reader pad counts are accordingly significantly reduced, enhancing disc file manufacturability and reliability.

It is therefore advantageous to provide a pre-amplifier supporting the sharing of a common terminal 218 between all magneto-resistive read elements 206, 208, 210, yielding in an N-magneto-resistive read elements 206, 208, 210 configuration, N+1 interconnects 212, 214, 216, 218 rather than 2N interconnects.

Figure 3:
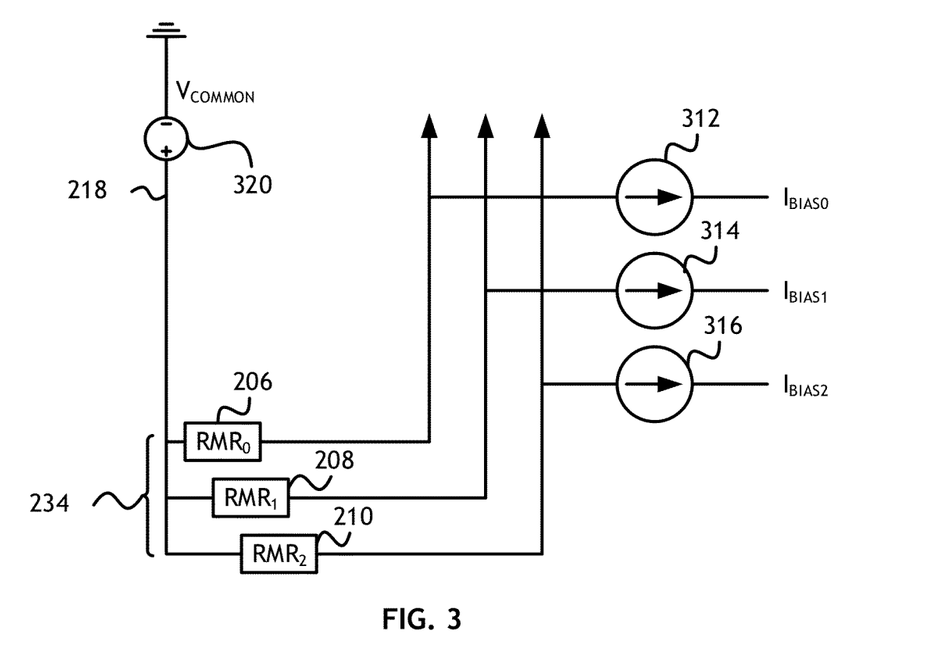
FIG. 3 shows a schematic view of an embodiment of a portion of a pre-amplifier according to the present invention having current biasing elements.

Referring to FIG. 3, a schematic view of an embodiment of a portion of a pre-amplifier according to the present invention having current biasing elements for the magneto-resistive heads is shown. In at least one embodiment of the present invention, a head slider 234 includes a plurality of magneto-resistive read elements 206, 208, 210, each having one terminal connected to a common terminal 218. Each magneto-resistive read element 206, 208, 210 includes a second terminal connected to dedicated current biasing element 312, 314, 316. Because the magneto-resistive read elements 206, 208, 210 on the head slider 234 are spaced closely, typically 5-10 nanometers, from the grounded magnetic recording surface, it is essential to limit the maximum voltage on the head 234 to prevent arcing.

In this embodiment, where the voltage source 320 is short circuited, the maximum magnitude of the head-to-medium (ground) voltage is:

$$V_{head\_medium} = \max(Rmr_0 \cdot I_{bias_0}, Rmr_1 \cdot I_{bias_1}, Rmr_2 \cdot I_{bias_2})$$

Where $Rmr_0$ represents a resistance associated with a first ancillary magneto-resistive read element 206, $Rmr_2$ represents a resistance associated with second ancillary magneto-resistive read element 210 and $Rmr_1$ represents a resistance associated with a primary magneto-resistive read element 208; and $I_{bias_0}$ represents the magnitude of a current associated with a first ancillary current biasing element 312, $I_{bias_2}$ represents the magnitude of a current associated with second current biasing element 316, $I_{bias_1}$ represents the magnitude of a current associated with a primary current biasing element 314

For applications requiring minimum head-to-ground potential magnitude, at the expense of complexity, embodiments of the present invention may further include a common-mode voltage source 320 connected to the common terminal 218. The mean common-mode voltage $V_{CMV}$ over the three magneto-resistive read elements 206, 208, 210 is:

$$V_{CMV} = V_{common} - \frac{(Rmr_0 \cdot I_{bias_0} + Rmr_1 \cdot I_{bias_1} + Rmr_2 \cdot I_{bias_2})}{6} \to 0$$

The common-mode voltage source 320 $V_{common}$ must exhibit very low noise and output impedance in the signal frequency range of interest and is regulated to a value which drives $V_{CMV}$ to substantially zero. A person skilled in the art may appreciate that while voltages and currents are illustrated with a particular directionality or polarity, current and voltage sources with opposite directionality and polarity are envisioned.

Voltage bias mode is achieved by regulating the current biasing elements 312, 314, 316 to values required to achieve the prescribed bias voltages across the associated magneto-resistive read elements 206, 208, 210.

A pre-amplifier according to embodiments of the present invention may utilize a head slider 234 having an interconnect burden of four wires, as opposed to the six wires necessary for a two-wire-per-magneto-resistive read element 206, 208, 210 configuration. Although the examples shown illustrate three magneto-resistive read elements 206, 208, 210, a person skilled in the art may appreciate that the concepts are also applicable to head sliders 234 have differing numbers of magneto-resistive read elements 206, 208, 210.

Figure 4:
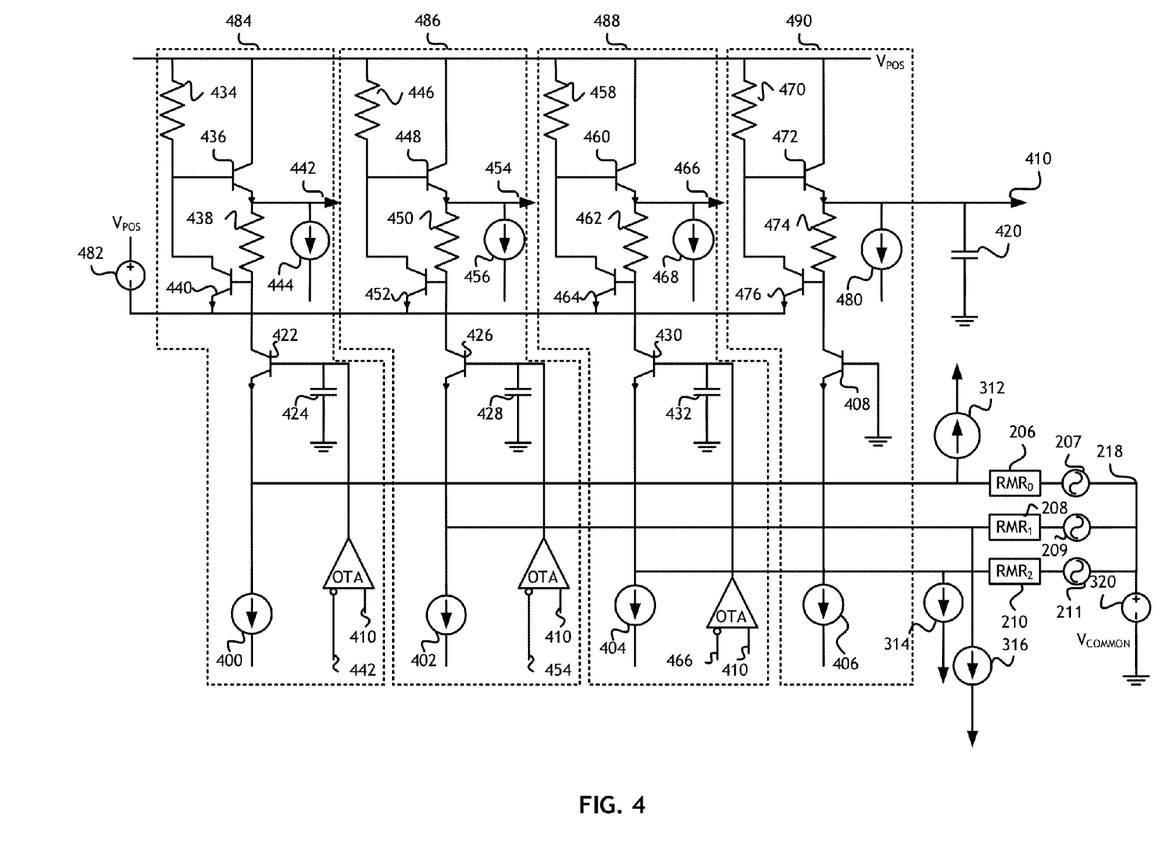
FIG. 4 shows a schematic view of an embodiment of a low-noise read amplifier within a pre-amplifier according to the present invention.

Referring to FIG. 4, a schematic view of an embodiment of a low noise read amplifier within a pre-amplifier according to the present invention is shown. In at least one embodiment, each magneto-resistive read element 206, 208, 210 is connected, via a corresponding non-common terminal, to a separate amplifier read channel 484, 486, 488. For example, a first ancillary magneto-resistive read element 206 is connected to a first amplifier read channel 484, a primary magneto-resistive read element 208 is connected to a second amplifier read channel 486 and a second ancillary magneto-resistive read element 210 is connected to a third amplifier read channel 488. In at least one embodiment, the amplifier further comprises a separate replica channel 490. For clarity, the transmission-line interconnects that join the elements 206, 208, 210 to their respective amplifier channels 484, 486, 488 are omitted.

The input impedance $Z_{in}$ of each of the three channels of the low-noise read amplifier is set by a programmable tail current source 400, 402, 404, 406 $I_{tail}$, each connected to the emitter of a bipolar input transistor 422, 426, 430, 408 $Q_{CB}$. The input impedance $Z_{in}$ of the illustrated common-base input stage is given by:

$$Z_{in} \cong \frac{q \cdot I_{tail}}{kT}$$

Each bipolar input transistor 422, 426, 430, 408 collector drives a single-ended shunt-feedback load, which establishes a quasi-virtual-ground and performs wideband current-to-voltage conversion. The shunt-feedback midband load transresistance approximates $R_{fb}$ as the product $Gm_{Q_1} \cdot R_l$ becomes large. Within Channel 484, for example, $R_{FB}$ and $R_L$ are respectively resistors 438 and 434; and $Q_1$ is transistor 440. An alternative to the feedback stage in low/moderate bandwidth situations is a simple cascode and load resistor. Each bipolar input transistor 422, 426, 430 base is connected to a base voltage and a base capacitor 424, 428, 432 connected to a ground. Alternatively, MOS transistors 422, 426, 430, 408 may be used in place of one or more bipolar transistors 422, 426, 430, 408.

Each magneto-resistive read element 206, 208, 210 may be modelled as embodying a corresponding internal signal ac voltage source $V_{sig}$ 207, 209, 211. Thus, for example, relative to a first signal ac voltage source $V_{sig_0}$ 207 embedded in the first ancillary magneto-resistive read element 206, the midband gain is defined by:

$$Av_{H_0} = \frac{V_{H_0}}{V_{sig_0}} \cong \frac{R_{FB}}{Rmr_0 + Z_{in}}$$

Each amplifier read channel 484, 486, 488 comprises a $Q_1$ emitter-follower transistor 436, 448, 460 where the collector of each $Q_1$ transistor 436, 448, 460 is connected to a voltage source $V_{pos}$, and a $Q_2$ amplification transistor 440, 452, 464 where the collector of each $Q_2$ transistor 440, 452, 464 is connected to the base of a corresponding $Q_1$ transistor 436, 448, 460 within the same amplifier read channel 484, 486, 488 and the emitter is connected to a terminal of a voltage source 482. An $R_{FB}$ feedback resistor 438, 450, 462 is interposed between the base of the $Q_2$ transistor 440, 452, 464 and the emitter of the $Q_1$ transistor 436, 448, 460 and an $R_L$ load resistor 434, 446, 458 is interposed between the base of the $Q_1$ transistor 436, 448, 460 and the voltage source $V_{pos}$ within the same amplifier read channel 484, 486, 488. The low-noise amplifier output for each amplifier read channel 484, 486, 488 corresponds to the emitter of the $Q_1$ transistor 436, 448, 460 in that channel 484, 486, 488. Common-base transistors 422, 426, 430 comprise the input devices for their respective channels.

Optional inflowing bleed current sources on bipolar input transistor 422, 426, 430, 408 collectors may be employed to preserve headroom for high $I_{tail}$.

To assure that bias current delivered by each bias current source flows in the associated magneto-resistive read element 206, 208, 210 and is not diverted by the common base stage, nulling loops are provided to match output voltage to a reference potential generated in a replica channel 490. The replica channel 490 comprises a $Q_1$ emitter-follower transistor 472 where the collector is connected to the voltage source $V_{pos}$, and a $Q_2$ amplification transistor 476 where the collector is connected to the base of the $Q_1$ transistor 472 and the emitter is connected to a terminal of the voltage source 482. An $R_{FB}$ feedback resistor 474 is interposed between the base of the $Q_2$ transistor 476 and the emitter of the $Q_1$ transistor 472 and an $R_L$ load resistor 470 is interposed between the base of the $Q_1$ transistor 472 and the voltage source $V_{pos}$. The replica channel 490 output $V_{ref}$ corresponds to the emitter of the $Q_1$ transistor 472. In at least one embodiment, the read amplifier of FIG. 4 is fabricated as an integrated circuit, hence that all amplifier channels 484, 486, 488, and the replica channel 490, closely match.

Each output 442, 454, 466 of the three amplifier read channels 484, 486, 488 (for example a first signal output 442 $V_{H_0}$) is compared to a reference output signal 410 $V_{ref}$ from the replica channel 490 in an individual operational transconductance amplifier (OTA), the current outputs of which are integrated on the associated base capacitors 424, 428, 432 $C_B$. This process sets the low-frequency pole (the low-corner-frequency) of the overall high-pass function of the signal-referenced loop. Three identical nulling loops are provided having transfer functions:

$$TF_{null\_loop} \cong \frac{\frac{sC_B}{Gm_{null}}}{\frac{sC_B \cdot (Rmr_0 + Z_{in})}{R_L \cdot Gm_{null}} + 1} \Rightarrow LCF \cong \frac{R_L \cdot Gm_{null}}{2\pi \cdot C_B(Rmr_0 + Z_{in})}$$

Low low-corner-frequency values imply low loop gains, and the bipolar input transistor 422, 426, 430 base current acts as a static disturbance, introducing offsets in $V_{H_0}$-$V_{ref}$. Use of a MOS configuration or various combinations of base current cancellation, or a large swamping base capacitors 424, 428, 432 $C_B$ Minimize the effect of base current in the common-base transistors. The base capacitors 424, 428, 432 $C_B$ low sides are grounded. In at least one embodiment of the present invention, superior noise rejection is obtained by tying the low ends to the read element common terminal. $Gm_{null}$ is the transconductance of the operational transconductance amplifiers. The above transfer function pertains to $Rmr_0$ 206; the same equation, with appropriate change in indices, would apply to magneto-resistive heads 208, 210 associated with the second and third read amplifier channels 486, 488 respectively.

Wideband single ended-to-differential amplifiers receive each of the three output signals 442, 454, 466 $V_{H_0}$, $V_{H_1}$, and $V_{H_3}$ signals relative to a reference output signal 410 $V_{ref}$ and deliver differential outputs to succeeding conventional differential amplifier stages.

The voltage source 482 $V_X$ establishes a desired collector current $I_{C\_Q_2}$ in the amplification transistors 440, 452, 464 $Q_2$. Ignoring base currents, the voltage source 482 is defined by:

$$V_X = I_{C\_Q_2} \cdot R_L + I_{tail} \cdot R_{FB} + V_{BE\_Q_1} V_{BE\_Q_2}$$

As a result, the collector of each bipolar input transistor 422, 426, 430 $Q_{CB}$ will sit at a voltage $V_{pos} - V_X + V_{BE\_Q_2}$.

Alternatively, a desired $I_{C\_Q_2}$ can be forced in the second amplification transistor 476 $Q_2$ of the replica channel 490, and the resultant emitter voltage can be buffered and applied to the other second amplification transistors 440, 452, 464 $Q_2$ emitters of the amplifier read channels 484, 486, 488.

If nulling loop bandwidth is much greater than that of the common-mode loop, the common-mode loop transfer function relative to the head terminals is approximately (unity gain CMV driver), $$TF_{CM\_loop} \cong \frac{1}{\frac{sC_{CM}}{Gm_{CM}} + 1} \Rightarrow BW_{CM\_loop} \cong \frac{Gm_{CM}}{2\pi \cdot C_{CM}}$$

Embodiments of the present invention may utilize bipolar or MOS transistors.

In at least one embodiment, the replica channel 490 output signal 410 may be used as a reference voltage for one or more differential amplifiers. Furthermore, each signal output 442, 454, 466 may be used as a second (dc level) for one or more post differential amplifiers serving as single-ended-to-differential convertors, and supplying additional gain.

While the exemplary embodiment shown herein includes three magneto-resistive read elements 206, 208, 210, a two-read-element version of the pre-amplifier is possible. The Preamplifier may be fabricated in various BiCMOS/bipolar, or CMOS processes. In particular, 50 GHz SiGe BiCMOS process is preferred.

Figure 5:
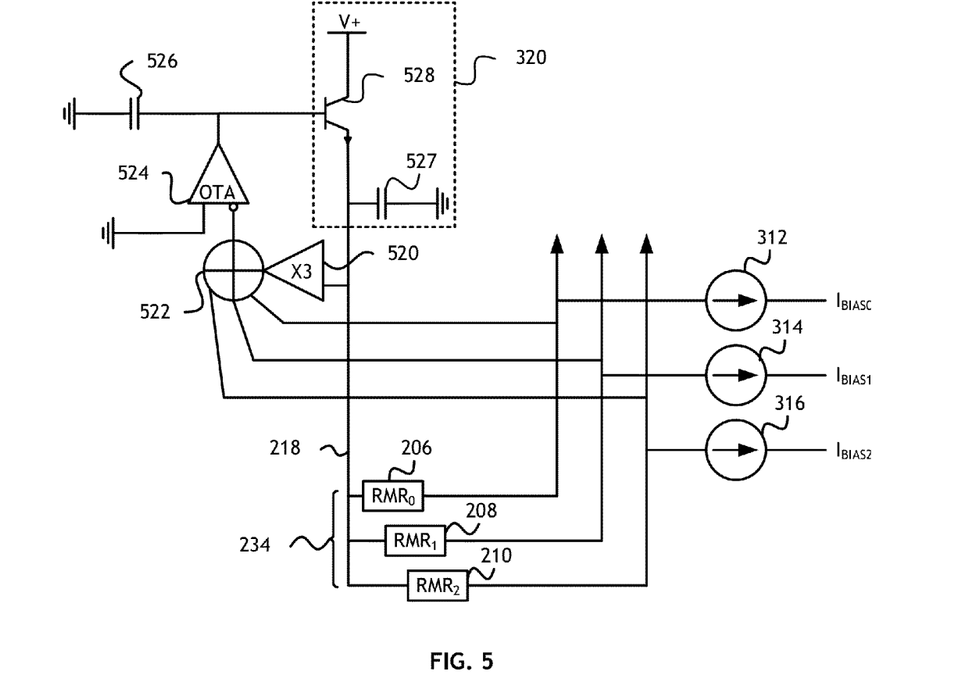
FIG. 5 shows a schematic view of an embodiment of a common-mode regulator associated with voltage bias control within a pre-amplifier according to the present invention.

Referring to FIG. 5, a schematic view of an embodiment of a common-mode regulator associated with either voltage or current bias control of magneto-resistive head common mode voltage within a pre-amplifier according to the present invention is shown. The purpose of the common-mode regulator is to provide a voltage (common-mode voltage source 320 $V_{common}$ of FIG. 3) to the common terminal 218, which drives the average common-mode voltage of the three heads to zero In one embodiment, where a head slider 234 has three magneto-resistive read elements 206, 208, 210 connected to individual current biasing elements 312, 314, 316 and to a common terminal 218, the common terminal forms the output of a feedback loop and the pre-amplifier senses magneto-resistive read element 206, 208, 210 common-mode voltages and regulates $V_{common}$ to that value necessary to establish a zero mean common-mode potential ($V_{CVM}$=0) over the center-point of the three magneto-resistive read elements 206, 208, 210. The feedback loop comprises an operational transconductance amplifier 524 that receives the computed common-mode voltage from a summing node 522 on and delivers its output current to a loop-compensating capacitor 526. The voltage on loop-compensating capacitor 526 is delivered to the gate of an NPN bipolar emitter-follower 528, the source of which connects to common terminal 218. The low output impedance of the emitter-follower 528, jointly with the low high-frequency impedance of a bypass capacitor 527, approximate a voltage source 320 such as in FIG. 3. The summing node 522 receives an input from the non-common terminal of each magneto-resistive read element 206,208, 210; and a version multiplied-by-three (multiplier 520) of the potential on the common wire 218. The by-three multiplication is equivalent to summing each of the common terminals. Thus, the summing node's 522 output is a scaled version of the mean common-mode voltage. In one embodiment, the functions of multiplier 520 and summing node 522 are performed by a resistive network.

As the other input of the operational transconductance amplifier 524 is at ground, the input from the summing node 522 is regulated to zero volts, in turn regulating the average common-mode voltage to zero. Near-zero head-to-storage medium potential reduces the risk of head-to-medium arcing for low head-medium spacing.

Alternatively, a pseudo-open-loop method of setting $V_{common}$ comprises estimating the value based on nominal or measured magneto-resistive read elements 206, 208, 210 resistance $R_{MR}$, and the associated bias currents. Such method can be implemented in hardware or performed by a processor with the result delivered to a digital-to-analog convertor.

The common-mode regulator scheme of FIG. 5 is applicable to both current and voltage magneto-resistive bias modes.

Figure 6:
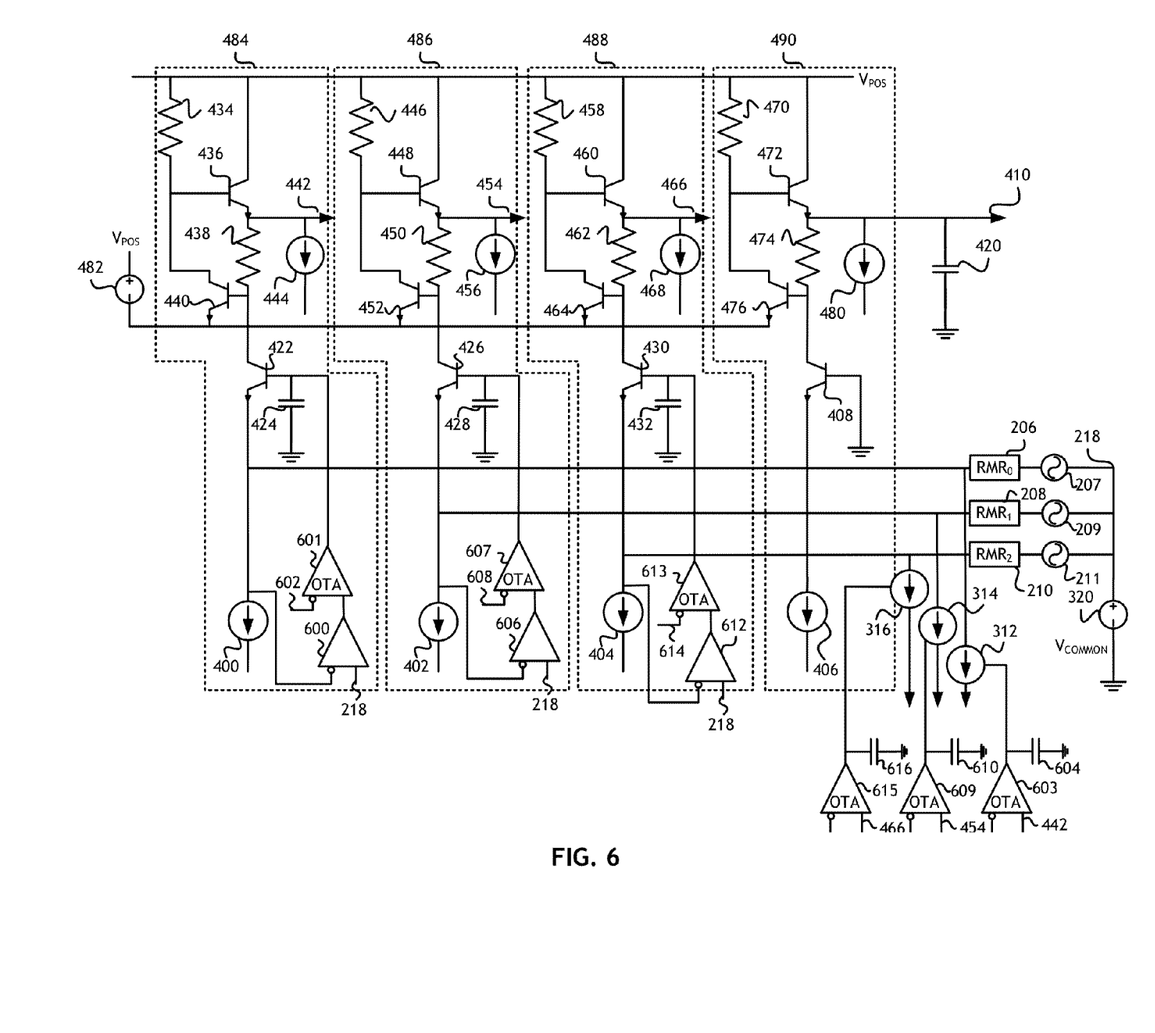
FIG. 6 shows a schematic view of an embodiment of a low noise read amplifier within a pre-amplifier associated with voltage bias control according to the present invention.

Referring to FIG. 6, a schematic view, similar to FIG. 4, of an embodiment of a low noise read amplifier within a pre-amplifier associated with voltage bias control according to the present invention is shown. In one embodiment, where a head slider 234 having three magneto-resistive read elements 206, 208, 210 connected to individual nulling current elements 312, 314, 316 and to a common terminal 218 with a voltage source 320, the common terminal 218 comprises a feedback loop and the pre-amplifier senses magneto-resistive read element 206, 208, 210 voltages and regulates $V_{common}$ to that value necessary to establish a zero mean common-mode potential ($V_{CVM}=0$) over the centerpoint of the three magneto-resistive read elements 206, 208, 210 as described in connection with FIG. 5.

Each of three amplifier read channels 484,486,488 is equipped with an operational transconductance amplifier 601, 607, 613 and difference amplifier 600, 606, 612, where each operational transconductance amplifier 601, 607, 613 receives the output from a corresponding difference amplifier 600, 606, 612 and a fixed voltage 602, 608, 614 specifying the bias voltage which is to be established across the associated $R_{MR}$. For example, in the first amplifier read channel 484, the first channel difference amplifier 600 senses the difference between the common terminal 218 and the first magneto-resistive read element 206 terminal. The difference is applied to first channel operational transconductance amplifier 601, the inverting input of which is a first read element fixed voltage 602 $V_{MR_0}$. The first read element fixed voltage 602 is the voltage that is desired to appear across the first magneto-resistive read element 206. The feedback loop thus formed is compensated by a corresponding base capacitor 424. Note that each magneto-resistive read element 206, 208, 210 may therefore be independently biased to a unique voltage.

To enforce the proper operating point within the first amplifier read channel 484, the first ancillary current biasing element 312, which was fixed for current bias mode, is now made voltage-controllable. The control voltage is derived by a feedback loop containing a first control operational transconductance amplifier 603 and first control compensating capacitor 604. The replica channel 488 output reference voltage 410 is compared with the first amplifier read channel 484 output voltage 442, and the difference driven to zero. When equilibrium is achieved, the operating point of the first amplifier read channel 484 is similar to that of the replica channel 490.

The second amplifier read channel 468 and third amplifier read channel 488 include similar structures for controlling the operating point with reference to a second read element fixed voltage 608 $V_{MR_1}$ and a third read element fixed voltage 614 $V_{MR_2}$. Similarly, the primary current biasing element 314 and secondary ancillary current biasing element 316 are voltage controlled by corresponding feedback loops including a second control operational transconductance amplifier 609 and second control compensating capacitor 610, and a third control operational transconductance amplifier 615 and third control compensating capacitor 616 respectively.

Figure 7:
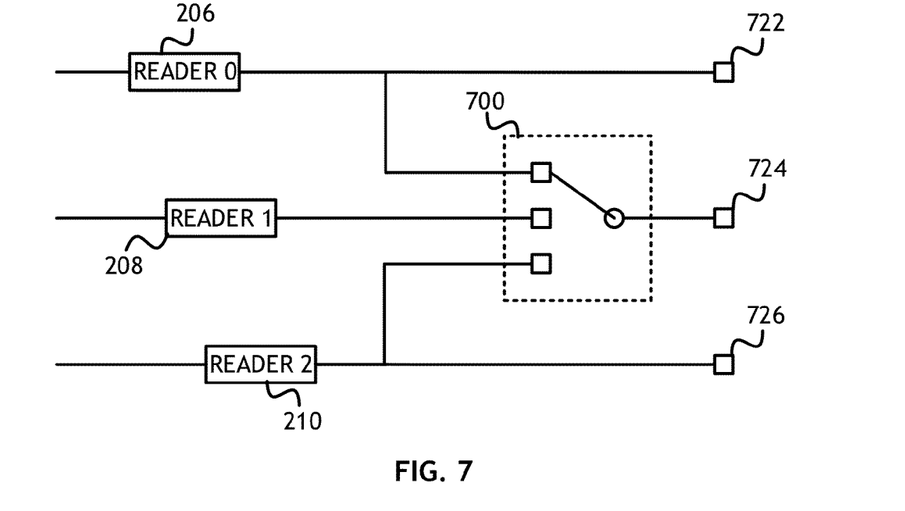
FIG. 7 shows a block diagram of an embodiment of the present invention for enhancing testability of reader pre-amplifiers.

Referring to FIG. 7, a block diagram of an embodiment of the present invention for enhancing testability of reader pre-amplifiers is shown. The low-noise amplifiers of FIGS. 4, 5 and 6 generate three read data signals, Read_signal$_0$ 206, Read_signal$_1$ 208, and Read_signal$_2$ 210. In normal use, each of these three differential signals is further amplified and presented at dedicated pre-amplifier outputs Head$_0$__P/N 722, Head$_1$__P/N 724, Head$_2$__P/N 726. For testing, either Read_signal$_0$ 206, or Read_signal$_2$ 210 can be multiplexed 700 onto the Head$_1$__P/N 724 output, under influence of a selection signal. In normal operation, Read_signal$_1$ 208 is directed to Head$_1$__P/N 724.

Existing single-channel test apparatus can characterize the bulk of the circuitry in the Pre-amplifier. Furthermore, reader front-end inter-channel characterization is enhanced, as all channels may now be viewed through a common set of back-end electronics. Although the multiplexing is shown as occurring among differential signals, it can also be performed in single-ended fashion.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A magnetic data storage device comprising:
a plurality of magneto-resistive read elements on a single slider, each comprising a first terminal and a second terminal wherein each second terminal is connected to a common lead;
a magnetic data recording element comprising a plurality of data tracks; and
a plurality of pre-amplification circuits, each of the plurality of pre-amplification circuits associated with one of the plurality of magneto-resistive read elements, each of the plurality of pre-amplification circuits comprising:
a magneto-resistive head biasing element; and
a feedback nulling loop;
a replica circuit configured to produce a desired reference voltage; and a variable voltage source configured to regulate an average common-mode voltage.

2. The magnetic data storage device of claim 1, further comprising:
a common-mode voltage control loop for regulating the average common mode voltage of the plurality of magneto-resistive read elements comprising:
a summation element connected to the first terminal of each of the plurality of magneto-resistive read elements, configured to calculate the average common mode voltage; and
an operational transconductance amplifier having an input and an output, the input being configured to receive a summation signal from the summation element and the output being configured to deliver an amplified summation signal to the common lead.

3. The magnetic data storage device of claim 2, further comprising a multiplier interposed between summation element and the common lead.

4. The magnetic data storage device of claim 3, further comprising a voltage source comprising a transistor wherein the base of the transistor is craven by the output of the operational transconductance amplifier and the emitter of the transistor is connected to the common lead.

5. The magnetic data storage device of claim 1, further comprising a plurality of read head current biasing elements, each of the plurality read head current biasing elements connected to the first terminal of one of the magneto-resistive read elements.

6. The magnetic data storage device of claim 5, each of the current biasing elements is voltage controlled.

7. A pre-amplifier for a data storage device comprising:
a plurality of amplification circuits, each of the plurality of amplification circuits associated with one of the plurality of magneto-resistive read elements, each of the plurality of amplification circuits comprising:
a magneto-resistive head biasing element; and
a feedback nulling loop;
a replica circuit configured to produce a desired reference voltage; and
a variable voltage source configured to regulate an average common-mode voltage.

8. The pre-amplifier of claim 7, further comprising:
a common-mode voltage control loop for regulating the average common mode voltage of the plurality of magneto-resistive read elements comprising:
a summation element connected to the first terminal of each of the plurality of magneto-resistive read elements, configured to calculate the average common mode voltage; and
an operational transconductance amplifier having an input and an output, the input being configured to receive a summation signal from the summation element and the output being configured to deliver an amplified summation signal to the common lead.

9. The pre-amplifier of claim 8, further comprising a multiplier interposed between summation element and the common lead.

10. The pre-amplifier of claim 9, further comprising a voltage source comprising a transistor wherein the base of the transistor is craven by the output of the operational transconductance amplifier and the emitter of the transistor is connected to the common lead.

11. The pre-amplifier of claim 7, further comprising a plurality of read head current biasing elements, each of the plurality read head current biasing elements connected to the first terminal of one of the magneto-resistive read elements.

12. The pre-amplifier of claim 11, each of the current biasing elements is voltage controlled.

13. A computer apparatus comprising:
a processor;
memory connected to a processor; and
a data storage element comprising:
a plurality of magneto-resistive read elements on a single slider, each comprising a first terminal and a second terminal wherein each second terminal is connected to a common lead;
a magnetic data recording element comprising a plurality of data tracks; and
a plurality of pre-amplification circuits, each of the plurality of pre-amplification circuits associated with one of the plurality of magneto-resistive read elements, each of the plurality of pre-amplification circuits comprising:
a magneto-resistive head biasing element; and
a feedback nulling loop;
a replica circuit configured to produce a desired reference voltage; and
a variable voltage source configured to regulate an average common-mode voltage.

14. The computer apparatus of claim 13, further comprising:
a common-mode voltage control loop for regulating the average common mode voltage of the plurality of magneto-resistive read elements comprising:
a summation element connected to the first terminal of each of the plurality of magneto-resistive read elements, configured to calculate the average common mode voltage; and
an operational transconductance amplifier having an input and an output, the input being configured to receive a summation signal from the summation element and the output being configured to deliver an amplified summation signal to the common lead.

15. The computer apparatus of claim 14, further comprising a multiplier interposed between summation element and the common lead.

16. The computer apparatus of claim 15, further comprising a voltage source comprising a transistor wherein the base of the transistor is craven by the output of the operational transconductance amplifier and the emitter of the transistor is connected to the common lead.

17. The computer apparatus of claim 16, further comprising a plurality of read head current biasing elements, each of the plurality read head current biasing elements connected to the first terminal of one of the magneto-resistive read elements.

* * * * *